United States Patent Office 3,506,762
Patented Apr. 14, 1970

3,506,762
METHOD OF AND COMPOSITION FOR ANTI-CONTRACTURANT AND LOCAL ANESTHESIA USING MEPHENESIN ACETYLSALICYLATE
Joseph Pouget, 134 Rue de Grenelle, Paris 7e, France
No Drawing. Application May 6, 1968, Ser. No. 727,026, which is a continuation-in-part of application Ser. No. 408,574, Oct. 21, 1964. Divided and this application Dec. 9, 1968, Ser. No. 813,346
Claims priority, application France, Oct. 24, 1963, 951,612
Int. Cl. A61k 27/00
U.S. Cl. 424—230                2 Claims

ABSTRACT OF THE DISCLOSURE

This invention relates to compositions and methods of relaxing muscular tension, strain, irritation and contraction using mephenesin acetylsalicylate.

---

This application is a division of my application Ser. No. 727,026, filed May 6, 1968 as a continuation of application Ser. No. 405,574, filed Oct. 21, 1964 and now abandoned.

The present invention relates to a new composition of matter or compound and, more particularly, to medicaments incorporating same and improved anticontracturant treatments and local anesthesia accomplished with the aid of this new composition of matter.

I have discovered that pharmaceutical preparations for local application and use as an antispasmodic and muscular relaxing preparation are exceptionally effective when they include a new composition of matter, which will be identified herein as mephenesin acetylsalicylate and having the ostensible empirical formula:

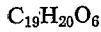

$$C_{19}H_{20}O_6$$

It has now been discovered that this new composition of matter, which can be produced by esterifying mephenesin with acetylsalicylic acid advantageously by conventional pyridinic acylation. Thus, when pyridinic acylation of mephenesin is carried out with the chloride of acetylsalicylic acid (aspirin chloride), it is possible to obtain mephenesin acetylsalicylate as a distinct compound. As previously indicated, this compound, which has a calculated molecular weight of 344.3 and a structural formula determined from its method of production is essentially as follows:

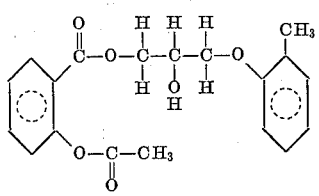

From its structural formula, the mephenesin acetylsalicylate or (methyl-2,phenoxy)-3-propanediole-1,2, or as the acetylsalicylate of 3-ortho-toloxy-1,2-propanediol. Since mephenesin is sometimes referred to as orthocresyl-alpha-glycerol ether, the new compound can also be designated as the acetylsalicylate of this latter substance. In general, the compound has been found to be highly effective as a local anesthetic and as an anticontracturant capable of relaxing muscular tension, strain, irritation and contraction. The product, when prepared by pyridinic acylation of mephenesin acetylsalicylic chloride and washing with hydrochloric acid is found to have a boiling point at 4 mm. Hg of 228° to 235° C. and at 8 mm. Hg of 245° to 255° C. Tests confirm the existence of the acetylsalicylic fragment and the characteristic parts of the mephenesin fragment upon degradation of the product, the pale-yellow oily compound is very slightly soluble in water, highly soluble in lower alcohols (ethanol), ethers (etheyl ether), acetone, ethyl acetate, benzene, toluene and chloroform, while alcohol and acetone solutions of the compound precipitate it when water is added. In the purified state, the product is believed to have a boiling point at 4 mm. Hg of 232° to 234° C.

The product possesses pharmacological properties which in some respects are similar to those of aspirin although it is essentially more stable than aspirin the presence of water and moisture. It is highly effective as a local anesthetic and analgesic for the treatment of human contractions and irritations of the type arising from physical strain, fatigue and the like. The compound is applied superficially in the form of a lotion, cream, emulsion, suspension or other composition and can be present in an amount ranging between substantially 1 and 10 parts by weight per 100 parts by weight, i.e. 1 to 10% by weight, of the vehicle which may contain paraffin oils, petroleum jelly, polyethylene glycols or other materials suitable for superficial application.

The invention will become more readily apparent from the following specific examples of the method of producing the new compound constituting the subject matter of the present invention and the additional examples of therapeutic applications of the compound given below.

EXAMPLE

Preparation of reactant

Aspirin chloride (acetylsalicylic chloride) is obtained by treating acetylsalicylic acid (aspirin-$C_2H_3O_2C_6H_4CO_2B$) with thionyl chloride and distilling the mixture. A thoroughly dried 1-liter flask is used in the reaction vessel into which 180 grams (1 mole) of acetylsalicylic acid and 260 grams (2 moles) of thionyl chloride are introduced. The mixture is refluxed with gentle heating until all of the acetylsalicylic acid goes into solution, i.e. a period of about 45 minutes. The result is a light-yellow clear liquid. Residual and excess thionyl chloride is distilled in vacuo by heating in a water or mud bath. It must be noted that throughout the preparation of the aspirin chloride, moisture- and water-free conditions must prevail to prevent hydrolysis of the thionyl chloride.

When residual thionyl chloride is distilled off, approximately 80 to 100 grams are obtained which may be used without further purification as a raw material for the production of further batches of the acetylsalicylic chloride. The latter compound is found to be highly unstable at ambient pressures when heated and can be purified by distillation in vacuo, retaining the fraction passing over at 131° to 134° C. at 7 mm. Hg; 140° to 144° C. at 11 mm. Hg; and 180° to 184° C. at 28 mm. Hg. Decomposition results at the boiling point at higher pressures. Approximately 160 to 180 grams of the slightly yellow-tinted liquid (acetylsalicylic acid) is obtained (i.e. about 80 to 90% of the theoretical yield). Since it is essential for the subsequent reaction that the acetylsalicylic chloride be highly pure, it is desirable that only an intermediate portion of the distillate be retained with the initial portion and final portion of the distillation being combined with subsequent batches for redistillation. The paleness of the color is an excellent indication of the suitability of the retained fraction. The acetylsalicylic chloride can be stored in a ground-glass-stoppered and thoroughly dried vessel although it is preferred to use it as soon as possible.

Preparation of mephenesin acetylsalicylate 10.8 grams (0.06 mole) of mephenesin is dissolved in 40 ml. of pyridine and the mixture chilled in ice. Into the cooled solution the acetylsalicylic chloride is added drop-by-drop with agitation until 12 grams (0.06 mole) of the aspirin chloride is added. At the conclusion of this addition, the mixture is permitted to stand for one hour under refrigeration and then for an additional hour at ambient temperature. Subsequently, 500 ml. of 10% aqueous hydrochloric-acid solution is added slowly and with agitation. An oily layer separates from the reaction mixture and is removed by decantation whereupon the oily layer is washed by shaking it three times with 50 ml. quantities of the hydrochloric acid. The product is heated in vacuo and, after elimination of water, the fraction coming over at 228° to 235° C. at 4 mm. Hg or at 245° to 255° C. at 8 mm. Hg is retained. The yield is about 60% of theoretical of mephenesin acetylsalicylate.

Elemental analysis of the product gave the following results: carbon calculated 66.27%, found 66.01% and 66.86% in two preparations; hydrogen calculated 5.85%, found 6% and 5.82% in the two preparations; and oxygen, calculated 27.87% and found 28.14% and 27.99%, all percents by weight. The molecular weight of the compound was determined by saponification and was found to be 325.5, but calculated as 344.3. The structure of the compound was determined by degradation techniques in which 0.3 grams of the product was dissolved in 5 ml. of ethanol and a tablet of sodium carbonate added. After boiling for several minutes, the mixture was neutralized and a part of the solution gave an intense violet color, indicating the presence of salicylic acid, when treated with ferric chloride. Another part of the neutralized solution was acidified with 1 ml. of sulfuric acid and brought to the boiling point whereupon an odor of ethyl acetate was detected, indicating that acetic acid was a decomposition product of the neutralization of the mephenesin acetylsalicylate.

As previously indicated, the new product is a light-yellow oily liquid whose boiling point, after redistillation in vacuo, is 232° to 234° C. at 4 mm. Hg and has a stability for exceeding that of aspirin in the presence of moisture, although the hydrolysis curves of aspirin and the mephenesin have similar appearances. After beginning rapidly, the rate of hydrolysis attains a level at which it further takes place only very slowly. From a quantitative point of view, however, the mephenesin acetylsalicylate is much more stable than aspirin in aqueous media and in alcoholic solutions. The product can be employed as the hydrogen chloride in pharmacological preparations where this resistance to hydrolysis is important.

The following specific examples of actual clinical uses of the product show its effectiveness as a human medicament for the relaxation of muscular contractions and as a local analgesic in the treatment of cramp and fatigue contractions, myalgic muscular disorders, strain lumbagos, lumbar strain, stiff neck, strained back, sprains, and the like.

EXAMPLE A

A 23-year-old male suffering from muscular pain at the scapula as a result of intense efforts in athletics is treated four times daily with a lotion containing mephenesin acetylsalicylate as produced above. A conventional body lotion was employed with the mephenesin acetylsalicylate added in approximately 5 parts by weight to 100 parts of the composition. The pain and irritation disappeared completely. Noticeable relief was obtained after several applications. The lotion consists essentially of 5 parts by weight mephenesin acetylsalicylate, 10 parts by weight of paraffin oil and sufficient petroleum jelly to bring the lotion to 100 parts.

EXAMPLE B

A 38-year-old male suffering from lumbago obstructions of flection of the spinal column was treated four times daily by superficially rubbing with the lotion described above. After four days the pain disappeared completely and flection of the vertebral column became possible. The best results are obtained when the mephenesin acetylsalicylate was incorporated in a lotion, gel, linament or cream in a conventional vehicle and applied with massage and rubbing. Similar results were obtained when instead of the lotion of Example A, anhydrous cream consisting of 5 parts by weight mephenesin acetylsalicylate and 95 parts by weight of polyethylene glycol (M.W. 1500) was used. A cream emulsion having similar properties was produced by mixing 5 parts by weight mephenesin acetylsalicylate, 19.5 parts by weight propylene glycol monostearate, 1.5 parts by weight petroleum oil, 3 parts by weight petroleum jelly, 0.5 parts by weight methyl p-hydroxy benzoate, the balance water to make 100 parts of the composition.

I claim:

1. An anticontracturant and local-anesthetic composition comprising mephenesin acetylsalicylate having the structure formula:

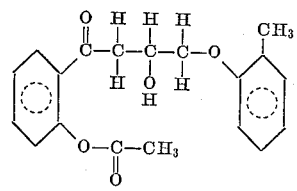

in an amount ranging between 1 and 10% by weight in a vehicle selected from the group which consists of paraffin oils, petroleum jelly and polyethylene glycols.

2. A method of relaxing muscular tension, strain, irritation and contraction in humans, comprising applying to the skin in the region of the muscular tension, strain, irritation and contraction an analgesically effective dosage of the composition defined in claim 1.

References Cited

UNITED STATES PATENTS 3,198,827  8/1965  Ohnacker _____ 424—230

ALBERT T. MEYERS, Primary Examiner

J. D. GOLDBERG, Assistant Examiner

FO-1050
(5/69)

UNITED STATES PATENT OFFICE
CERTIFICATE OF CORRECTION

Patent No. 3,506,762          Dated June 9th, 1970

Inventor(s) Joseph Pouget

It is certified that error appears in the above-identified patent and that said Letters Patent are hereby corrected as shown below:

Column 1, line 8, read:

-- 405,574, October 21, 1964. Divided and this application -- .

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents